(12) United States Patent
Lee et al.

(10) Patent No.: US 9,501,094 B2
(45) Date of Patent: Nov. 22, 2016

(54) COMBINATIONAL SENSING TYPE FINGERPRINT IDENTIFICATION DEVICE AND METHOD

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 14/824,711

(22) Filed: Aug. 12, 2015

(65) Prior Publication Data

US 2016/0055364 A1 Feb. 25, 2016

(30) Foreign Application Priority Data

Aug. 20, 2014 (TW) .............................. 103128567 A

(51) Int. Cl.
  *G06K 9/00* (2006.01)
  *G06F 1/16* (2006.01)
(52) U.S. Cl.
  CPC .............. *G06F 1/16* (2013.01); *G06K 9/0002* (2013.01)
(58) Field of Classification Search
  USPC .............. 382/124, 125, 115, 162, 165; 250/208.1; 324/662, 672; 435/252.3, 435/320.1, 350; 455/556.1, 566; 530/350
  See application file for complete search history.

(56) References Cited

U.S. PATENT DOCUMENTS

| | | | | |
|---|---|---|---|---|
| 5,907,627 A | * | 5/1999 | Borza .................. | G06K 9/0002 250/208.1 |
| 6,882,164 B2 | * | 4/2005 | Yano .................. | G06K 9/00087 324/663 |
| 6,937,031 B2 | * | 8/2005 | Yoshioka ........... | G06K 9/00087 324/662 |

* cited by examiner

*Primary Examiner* — Anh Do
(74) *Attorney, Agent, or Firm* — Muncy, Geissler, Olds & Lowe, P.C.

(57) ABSTRACT

A combinational sensing type fingerprint identification device includes plural sensing electrodes; plural sensing electrode switches; plural first sensed signal connection lines, and a controller. Each sensing electrode switch corresponds to one sensing electrode and has a first terminal, a second terminal connected to a common signal, a third terminal connected to a corresponding sensing electrode, and a control terminal Each first sensed signal connection line is connected to the first terminals of the sensing electrode switches in one column. The controller is connected to the control terminal of each sensing electrode switch for controlling whether the sensing electrode switches are electrically connected to the common signal or corresponding first sensed signal connection lines. The controller configures the control terminals of the sensing electrode switches for allowing a part of the sensing electrodes to be electrically connected to the corresponding first sensed signal connection lines.

15 Claims, 9 Drawing Sheets

COMBINATIONAL SENSING TYPE FINGERPRINT IDENTIFICATION DEVICE AND METHOD

BACKGROUND OF THE INVENTION

1. Field of the Invention

The present invention relates to the technical field of fingerprint identification and, more particularly, to a combinational sensing type fingerprint identification device and method.

2. Description of Related Art

Biological feature sensing and comparing technologies have been maturely and widely applied in identifying and verifying the identity of a person. Typical biometric identification types include fingerprint, voiceprint, iris, retina identifications, and the like.

For consideration of safe, comfortable, and efficient identification, the fingerprint identification has become the most popular one. The fingerprint identification generally requires a scanning to input a fingerprint or a finger image of a user and store the unique features of the finger image and/or the fingerprint for being further compared with the fingerprint reference data built in a database so as to identify or verify the identity of a person.

The image input types of the fingerprint identification include optical scanning, thermal image sensing, capacitive sensing, and the like. The optical scanning type is difficult to be applied in a mobile electronic device due to its large volume, and the thermal image sensing type is not popular due to its poor accuracy and reliability. Thus, the capacitive sensing type gradually becomes the most important biometric identification technology for the mobile electronic device.

FIGS. 1A and 1B are local cross-sectional views of a typical fingerprint sensing region, which illustrate a capacitive fingerprint identification sensor interacting with a fingerprint. In FIG. 1A, the fingerprint has the ridges located on sensing elements. In FIG. 1B, the fingerprint has the ridges located on the gaps between the sensing elements.

As shown in FIGS. 1A and 1B, the capacitive finger identification sensor has a plurality of sensing elements 110, and the fingerprint 130 presses on a non-conductive substrate 120. Typically, a ridge 140 of the fingerprint 130 has an effective width of about 200 μm to 300 μm, and accordingly a sensing element 110 has a width smaller than 200 μm. In FIG. 1A, when the ridge 140 of the fingerprint 130 is located on the sensing element 110, a strong signal can be sensed, so that the sensed image of the fingerprint 130 can be effectively detected and accurately obtained. The ridge 140 of the fingerprint 130 in FIG. 1B is located between the sensing elements 110; that is, a valley 150 of the fingerprint 130 is located on a sensing element 110, resulting in that there is a weak signal or even no signal sensed. The two cases cited above are the extreme condition on fingerprint identification. However, when a sensing element 110 corresponds to a partial ridge 140 and a partial valley 150, the signal sensed by the sensing signal is in-between the above two extreme states, which is likely to be affected by noises, resulting in an erroneous decision. A direct approach to overcome this problem is to reduce the area of the sensing element for increasing the resolution. However, the increase of resolution may cause the difficulties in increasing the number of sensing elements and decreasing the amount of sensing, resulting in that the processing time is increased, and the accuracy of fingerprint identification is reduced.

Therefore, it is desirable to provide an improved fingerprint identification device and method to mitigate and/or obviate the aforementioned problems.

SUMMARY OF THE INVENTION

The object of the present invention is to provide a combinational sensing type fingerprint identification device and method, which can dynamically configure a size of a sensing block and move the sensing block over the entire sensing plane, thereby sensing a stronger signal to effectively and accurately detect a fingerprint.

In one aspect of the invention, there is provided a combinational sensing type fingerprint identification device, which includes: a substrate; a plurality of sensing electrodes arranged on the substrate for sensing a fingerprint and generating corresponding sensed signals; a plurality of sensing electrode switches arranged in columns and rows, each corresponding to one sensing electrode and having a first terminal, a second terminal connected to a common signal, a third terminal connected to a corresponding sensing electrode, and a control terminal; a plurality of first sensed signal connection lines, each connected to the first terminals of the sensing electrode switches in one column; and a controller connected to the control terminal of each of the sensing electrode switches for controlling whether the sensing electrode switches are electrically connected to the common signal or corresponding first sensed signal connection lines, wherein the controller configures the control terminals of the sensing electrode switches for allowing a part of the sensing electrodes to be electrically connected to the corresponding first sensed signal connection lines, thereby sensing the fingerprint and generating the corresponding sensed signals.

In another aspect of the invention, there is provided a combinational sensing type fingerprint identification method, which is applied in a fingerprint identification device including a controller and a plurality of sensing electrodes arranged on one surface of a substrate in rows and columns to form an N×M matrix for sensing a fingerprint, where N and M are each a positive integer. The method includes the steps of: (A) the controller initializing a first position index and a second position index; (B) implementing a moving window at a start position on the sensing electrodes formed as the N×M matrix, and electrically connecting the sensing electrodes within the moving window to form a sensing block for performing fingerprint sensing; (C) the controller increasing the second position index by one so as to move the moving window and form the sensing block at another position; (D) the controller determining whether the second position index is greater than or equal to a second threshold, and returning to step (B) when the second position index is not greater than or equal to the second threshold; (E) the controller increasing the first position index by one so as to move the moving window; and (F) the controller determining whether the first position index is greater than or equal to a first threshold, and ending when the first position index is greater than or equal to a first threshold; otherwise performing a step (G) to initialize the second position index, and then return to step (B).

Other objects, advantages, and novel features of the invention will become more apparent from the following detailed description when taken in conjunction with the accompanying drawings.

DETAILED DESCRIPTION OF THE PREFERRED EMBODIMENT

Figure 2:
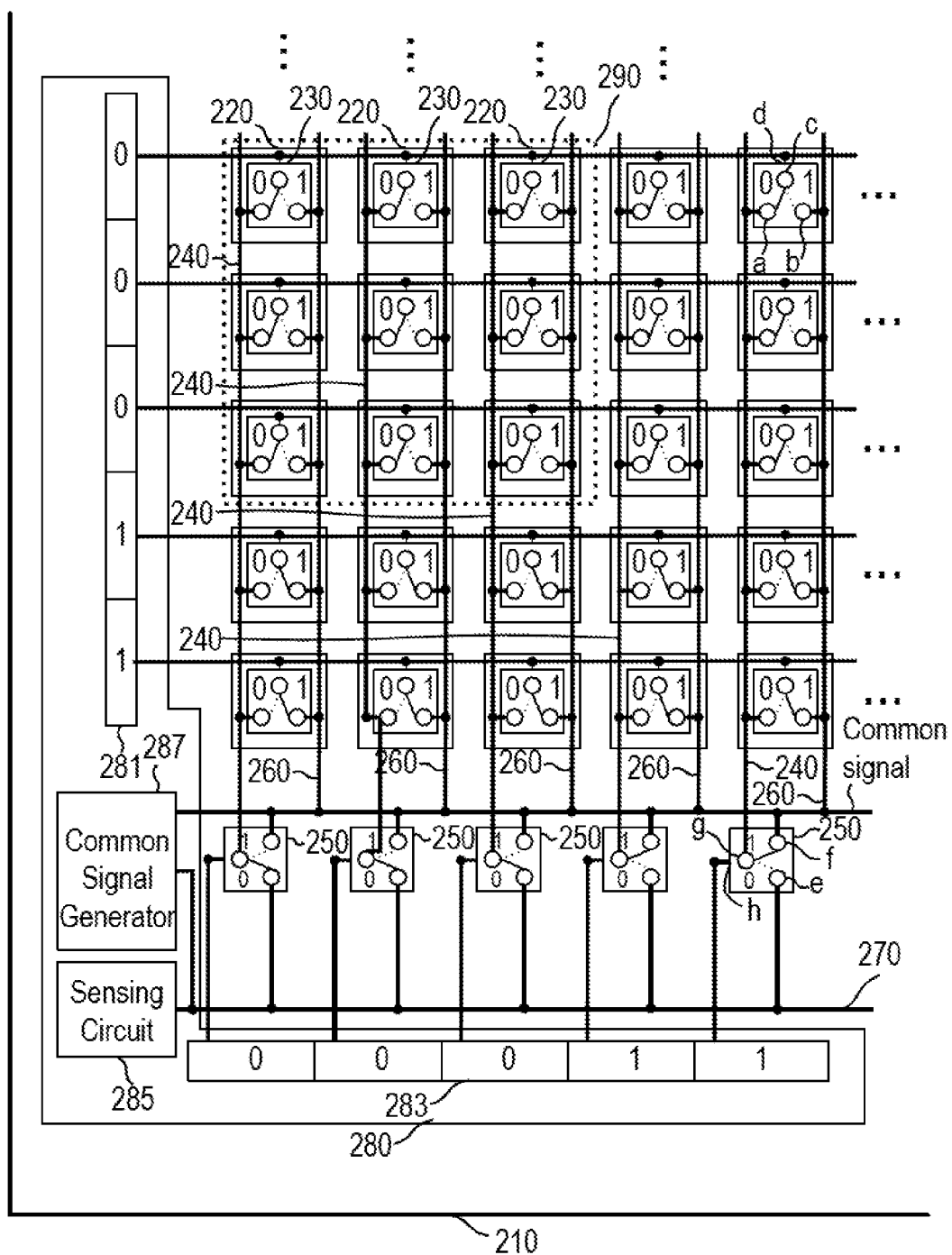
FIG. 2 is a schematic diagram of a combinational sensing type fingerprint identification device according to an embodiment of the present invention.

FIG. 2 is a schematic diagram of a combinational sensing type fingerprint identification device 200 according to an embodiment of the present invention. As shown in FIG. 2, the combinational sensing type fingerprint identification device 200 includes a substrate 210, a plurality of sensing electrodes 220, a plurality of sensing electrode switches 230, a plurality of first sensed signal connection lines 240, a plurality of connection line switches 250, a plurality of second sensed signal connection lines 260, a signal line 270, and a controller 280.

The plurality of sensing electrodes 220 are arranged on the substrate 210 in rows and columns for sensing a fingerprint and generating corresponding sensed signals. The sensing electrodes 220 are disposed on one surface of the substrate 210 for forming an N×M (N rows and M columns) matrix of sensing plane on the surface of the substrate 210, where N and M are each a positive integer.

Each of the sensing electrodes 220 can be a polygon, circle, ellipse, rectangle, or square. Preferably, the sensing electrode 220 is a rectangle with a width smaller than or equal to 200 μm and a length smaller than or equal to 200 μm. In this embodiment, there are 5×5 sensing electrodes 220 shown in FIG. 2 for illustrative purpose only, but not for limiting the number of sensing electrodes.

The plurality of sensing electrode switches 230 are also arranged in columns and rows, and each of the sensing electrodes switches 230 corresponds to a sensing electrode 220. Each sensing electrode 230 has a first terminal (a), a second terminal (b), a third terminal (c), and a control terminal (d), wherein the third terminal (c) is switchable to be connected to the first terminal (a) or the second terminal (b); i.e., the third terminal (c) is switched to be connected to the first terminal (a) or the second terminal (b) through the control terminal (d). The third terminal (c) of each of the sensing electrode switches 230 is connected to a corresponding sensing electrode 220, and the second terminal (b) of each of the sensing electrode switches 230 is connected to a common signal. In this embodiment, the common signal (Common signal) is generated by a common signal generator 287 of the controller 280.

Each of the first sensed signal connection lines 240 is connected to the first terminals (a) of the sensing electrode switches 230 in one column. In this embodiment, there are M first sensed signal connection lines 240. In FIG. 2, there are 5×5 sensing electrodes 220 shown, and thus only five first sensed signal connection lines 240 are illustrated.

The controller 280 is connected to the control terminal (d) of each of the sensing electrode switches 230 for controlling whether the sensing electrode switches 230 are electrically connected to the common signal or the corresponding first sensed signal connection lines 240.

The controller 280 configures the control terminals (d) of the sensing electrode switches 230 for allowing a part of the sensing electrodes 220 to be electrically connected to the corresponding first sensed signal connection lines 240, thereby sensing the fingerprint and generating the corresponding sensed signals.

When performing the fingerprint sensing, the controller 280 configures the control terminals (d) of the plurality of sensing electrode switches 230 so as to divide the plurality of sensing electrodes 220 into at least one sensing block and at least one non-sensing block, thereby using the at least one sensing block to perform the fingerprint sensing. When the fingerprint sensing is performed with the at least one sensing block, the sensing electrodes of the at least one non-sensing block are electrically connected to the common signal (Common signal) for shielding the at least one sensing block, such that the at least one sensing block is free of noise interference and its sensing sensitivity is increased. In this embodiment, the at least sensing block has N1×M1 sensing electrodes 220, where N1 and M1 are each a positive integer, 1≤N1≤N, and 1≤M1≤M. For convenient description, in this exemplary embodiment, the number of sensing blocks is one, and the number of non-sensing blocks is also one. In FIG. 2, we have N1=M1=3 and N=M=5, and thus the sensing block 290 denoted by a dotted line has 3×3 sensing electrodes 220. In FIG. 2, the non-sensing block includes all the sensing electrodes 220 other than those of the sensing block 290.

Preferably, the number of connection line switches 250 is M. In FIG. 2, there are 5×5 sensing electrodes 220, and thus five connection line switches 250 are illustrated. Each of the connection line switches 250 corresponds to a first sensed signal connection line 240. Each connection line switch 250 has a first terminal (e), a second terminal (f), a third terminal (g), and a control terminal (h), wherein the third terminal (g) is switchable to be connected to the first terminal (e) or the second terminal (f); i.e., the third terminal (g) is switched to be connected to the first terminal (e) or the second terminal (f) through the control terminal (h). The third terminal (g) of each of the connection line switches 250 is connected to the corresponding first sensed signal connection line 240, and the second terminal (f) thereof is connected to the common signal (Common signal).

Preferably, the number of second sensed signal connection lines 260 is M. In FIG. 2, there are 5×5 sensing electrodes 220, and thus five second sensed signal connection lines 260 are illustrated. Each of the second sensed signal connection lines 260 is connected to the second terminals (b) of the sensing electrode switches 230 in one column, and has one terminal connected to the common signal (Common signal).

The signal line 270 is connected to the first terminals (e) of the M connection line switches 250, and has one terminal connected to a sensing circuit 285 of the controller 280.

The controller 280 further includes a first bit shift register 281, a second bit shift register 283, the sensing circuit 285, and the common signal generator 287. Each of the first bit shift register 281 and the second bit shift register 283 has a plurality of shiftable bits. Each bit of the first bit shift register 281 is connected to the control terminals (d) of the sensing electrode switches 230 in one corresponding row. In FIG. 2, there are 5×5 sensing electrodes 220, and thus five bits are illustrated in the first bit shift register 281.

Each bit of the second bit shift register 283 is connected to the control terminal (h) of a corresponding connection line switch 250. In FIG. 2, there are 5×5 sensing electrodes 220, and thus five bits are illustrated in the second bit shift register 283.

Figure 7A:
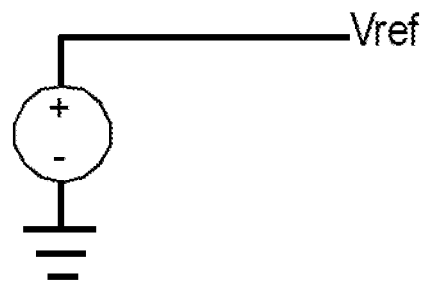
FIGS. 7A to 7E schematically illustrate examples of a common signal generator according to the present invention.
Figure 7B:
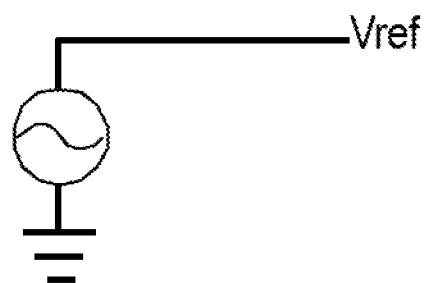
Figure 7C:
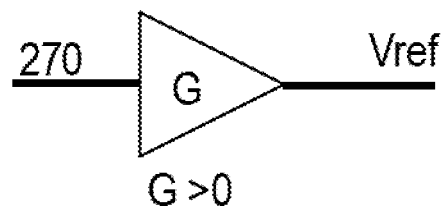
Figure 7D:
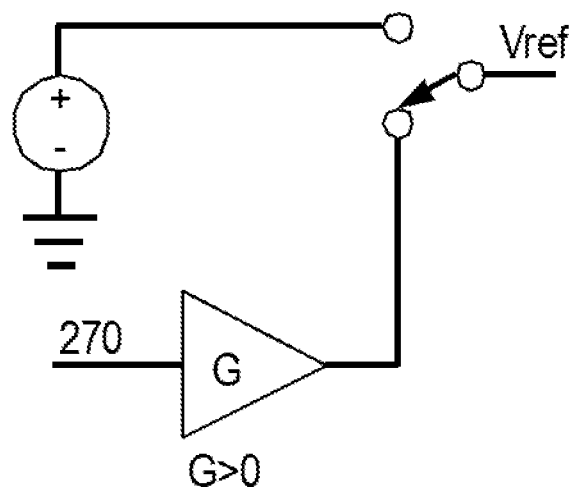
Figure 7E:
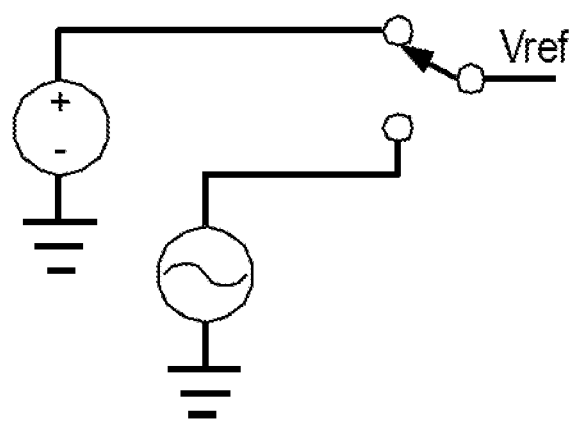

The common signal (Common signal) generated by the common signal generator 287 can be a constant DC voltage, a specific AC voltage signal, or a voltage signal equal to the sensed signal on the signal line 270 or an amplified sensed signal. FIGS. 7A to 7E are schematic views of five examples of the common signal generator 287 according to the present invention. In FIG. 7C, the sensed signal on the signal line 270 is amplified by an amplifier for generating the common signal (Common signal). The amplifier has a gain G greater than zero. In FIGS. 7A through 7E, the examples of FIGS. 7C and 7D are preferred.

In this embodiment, we have N1=M1=3 and N=M=5. It is essential to electrically connect the sensing electrodes 220 of the sensing block 290 to the signal line 270 for allowing the sensing circuit 285 to read the sensed signals of the sensing electrodes 220 in the sensing block 290, while all the sensing electrodes 220 in the non-sensing block are electrically connected to the common signal (Common signal) for shielding the sensing block 290, thereby preventing the sensing block 290 from the noise interference and increasing the sensing sensitivity. Therefore, at the beginning, the controller 280 configures the five bits of the first bit shift register 281 to be 00011b, so that the first terminals (a) of the sensing electrode switches 230 in the first, second and third rows corresponding to bits "0" are electrically connected to the corresponding third terminals (c), and the sensing electrodes 220 in the first, second and third rows are electrically connected to the first terminals (e) of the corresponding connection line switches 250. The second terminal (b) of each of the sensing electrode switches 230 in the fourth and fifth rows corresponding to bits "1" is electrically connected to the corresponding third terminal (c), and the sensing electrodes 220 in the fourth and fifth rows are electrically connected to the corresponding sensed signal connection lines 260 for being further connected to the common signal (Common signal).

The controller 280 configures the five bits of the second bit shift register 283 to be 00011b, so that the first terminals (e) of the connection line switches 250 in the first, second and third columns corresponding to bits "0" are electrically connected to the third terminals (g), and the first sensed signal connection lines 240 in the first, second and third columns are electrically connected to the signal line 270. The second terminals (f) of the connection line switches 250 in the fourth and fifth columns corresponding to bits "1" are electrically connected to the third terminals (g), so that the sensing electrodes 220 in the first, second and third rows and the fourth and fifth columns are electrically connected to the common signal (Common signal) through the connection line switches 250.

Figure 3:
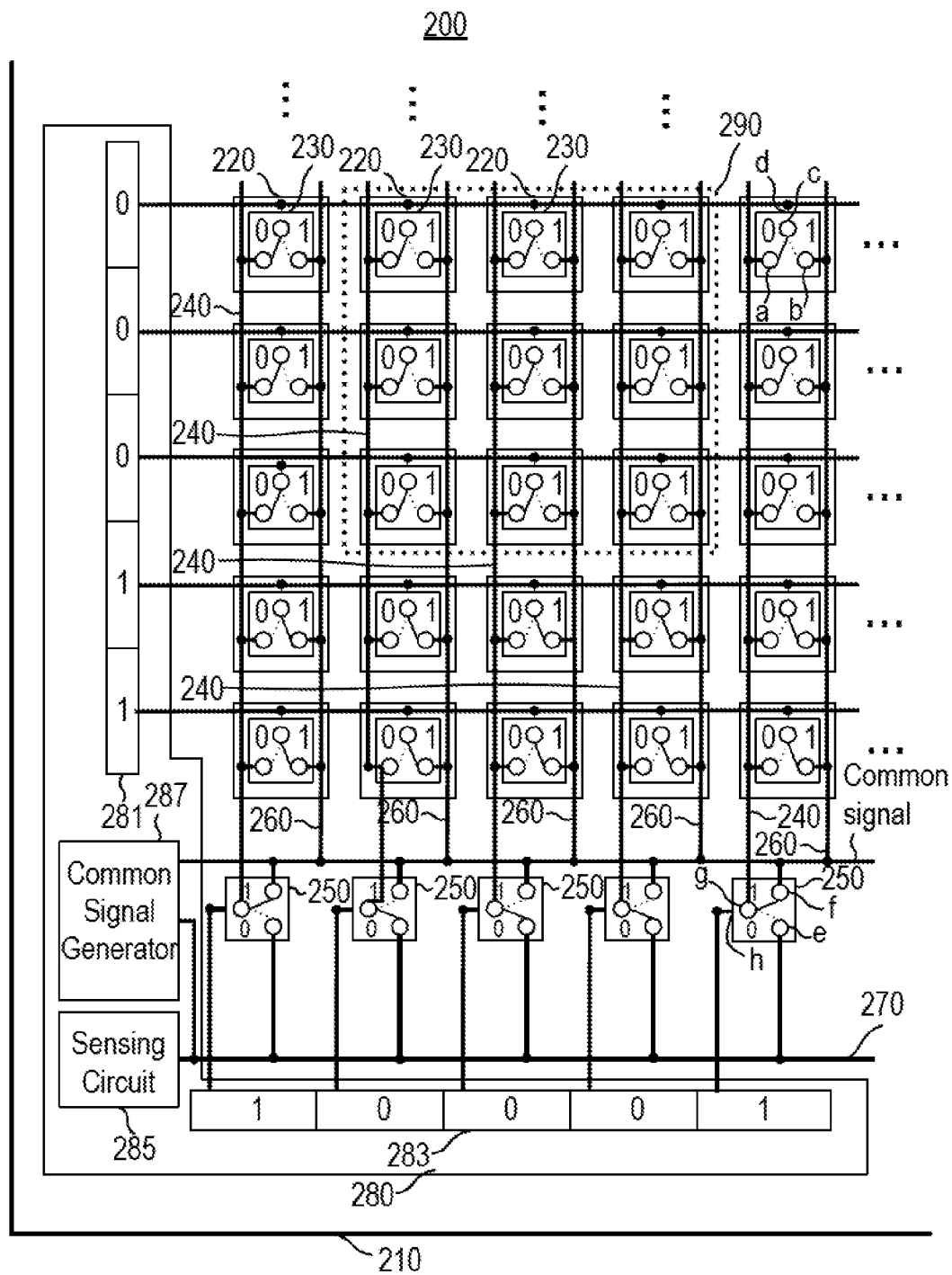
FIG. 3 is a schematic diagram of moving a sensing block right for one unit according to the present invention.

FIG. 3 is a schematic diagram of moving the sensing block 290 right for one unit according to the present invention. The five bits of the first bit shift register 281 are still 00011b, so that the sensing electrodes 220 in the first, second and third rows corresponding to bits "0" are electrically connected to the first terminals (e) of the corresponding connection line switches 250, and the sensing electrodes 220 in the fourth and fifth rows corresponding to bits "1" are electrically connected to the corresponding second sensed signal connection lines 260 for being further connected to the common signal (Common signal).

The controller 280 configures the five bits of the second bit shift register 283 to be 10001b, so that the first terminals (e) of the connection line switches 250 in the second, third and fourth columns corresponding to bits "0" are electrically connected to the third terminals (g), and the first sensed signal connection lines 240 in the second, third and fourth columns are electrically connected to the signal line 270. The second terminals (f) of the connection line switches 250 in the first and fifth columns corresponding to bits "1" are electrically connected to the third terminals (g), so that the sensing electrodes 220 in the first, second and third rows and the first and fifth columns are electrically connected to the common signal (Common signal) through the connection line switches 250.

Figure 4:
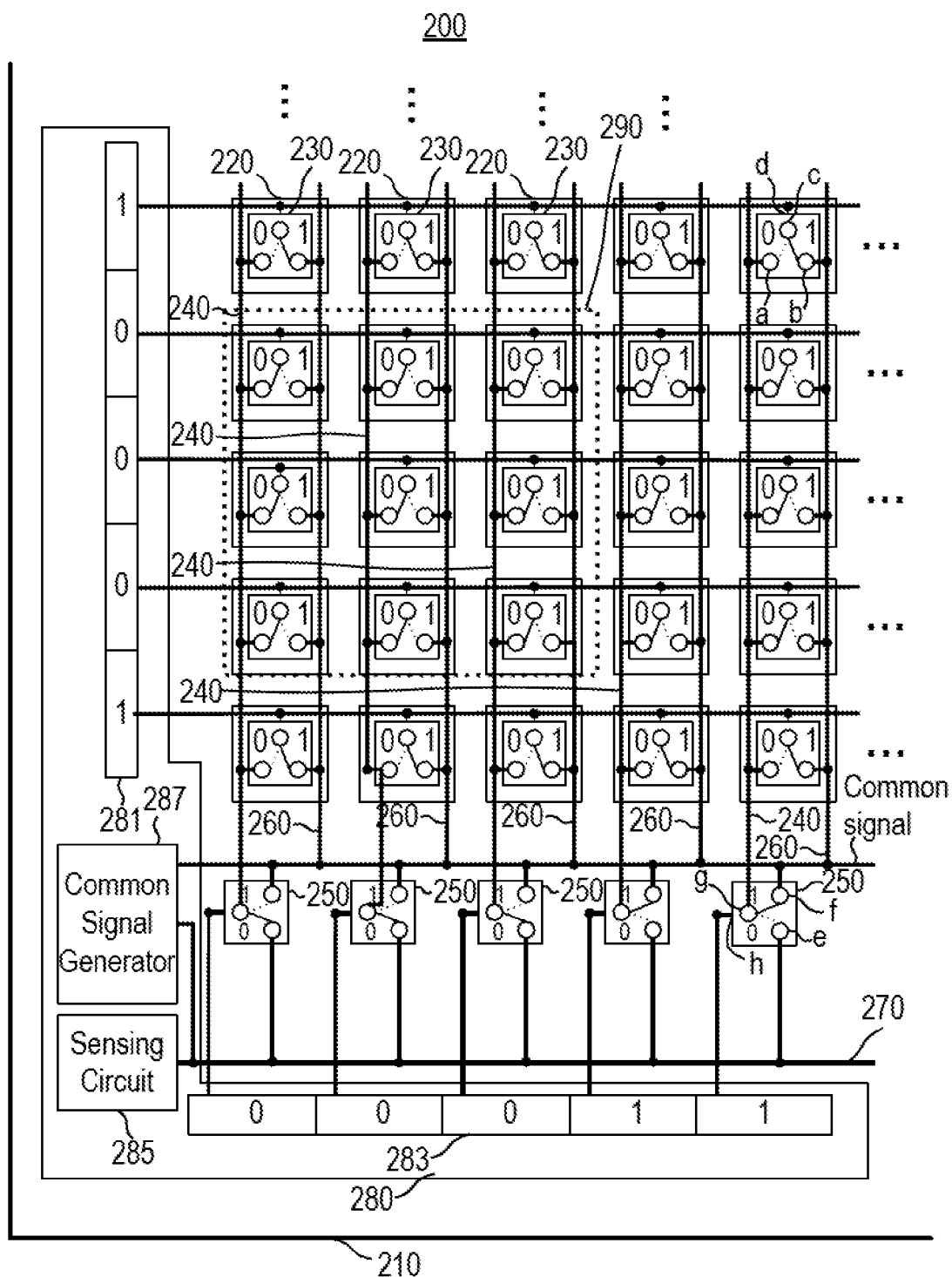
FIG. 4 is a schematic diagram of moving a sensing block down for one unit according to the present invention.

FIG. 4 is a schematic diagram of moving the sensing block down for one unit according to the present invention. The five bits of the second bit shift register 283 are configured to be 10001b, so that the sensing electrodes 220 in the second, third and fourth rows corresponding to bits "0" are electrically connected to the first terminals (e) of the corresponding connection line switches 250, and the sensing electrodes 220 in the first and fifth rows corresponding to bits "1" are electrically connected to the corresponding second sensed signal connection lines 260 for being further connected to the common signal (Common signal).

The controller 280 configures the five bits of the second bit shift register 283 to be 00011b, so that the first terminals (e) of the connection line switches 250 in the first, second and third columns corresponding to bits "0" are electrically connected to the third terminals (g), and the first sensed signal connection lines 240 in the first, second and third columns are electrically connected to the signal line 270. The second terminals (f) of the connection line switches 250 in the fourth and fifth columns corresponding to bits "1" are electrically connected to the third terminals (g), so that the sensing electrodes 220 in the second, third and fourth rows and the fourth and fifth columns are electrically connected to the common signal (Common signal) through the connection line switches 250.

As cited, the first bit shift register 281 and the second bit shift register 283 are configured by the controller 280 to have related values. In addition, the related values can be loaded with a load signal and then be shifted according to desired timings.

Figure 1A:
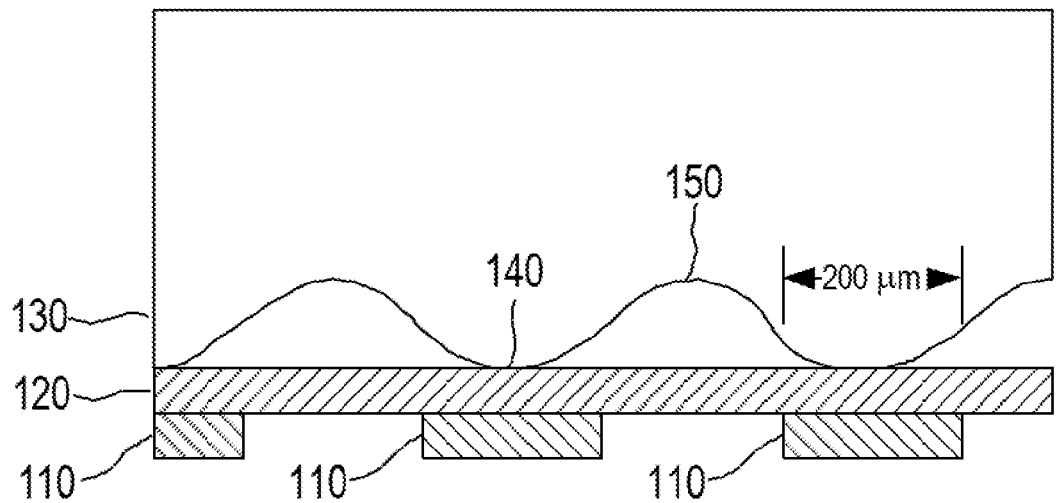
FIGS. 1A and 1B are local cross-sectional views of a typical fingerprint sensing region.
Figure 1B:
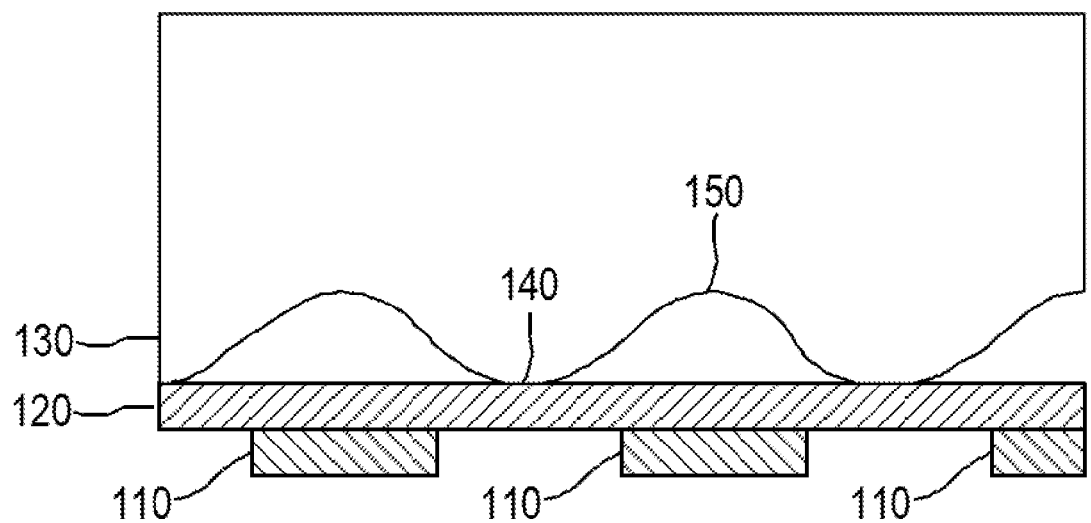

Therefore, it is known that the present invention can move the sensing block 290 up, down, left, and right for one unit, and the size of the sensing block 290 can be dynamically configured based on the effective widths of ridges and valleys of a fingerprint. In addition, the sensing block 290 in the present invention can be scanned over the entire sensing plane, such that it can be moved to the best position of the ridges for sensing the strongest sensed signal and avoiding the problem of fingerprint sensing not the same as that described in FIG. 1A and the problem described in FIG. 1B; i.e., the sensing block 290 can be accurately located to the position of FIG. 1A.

Figure 5:
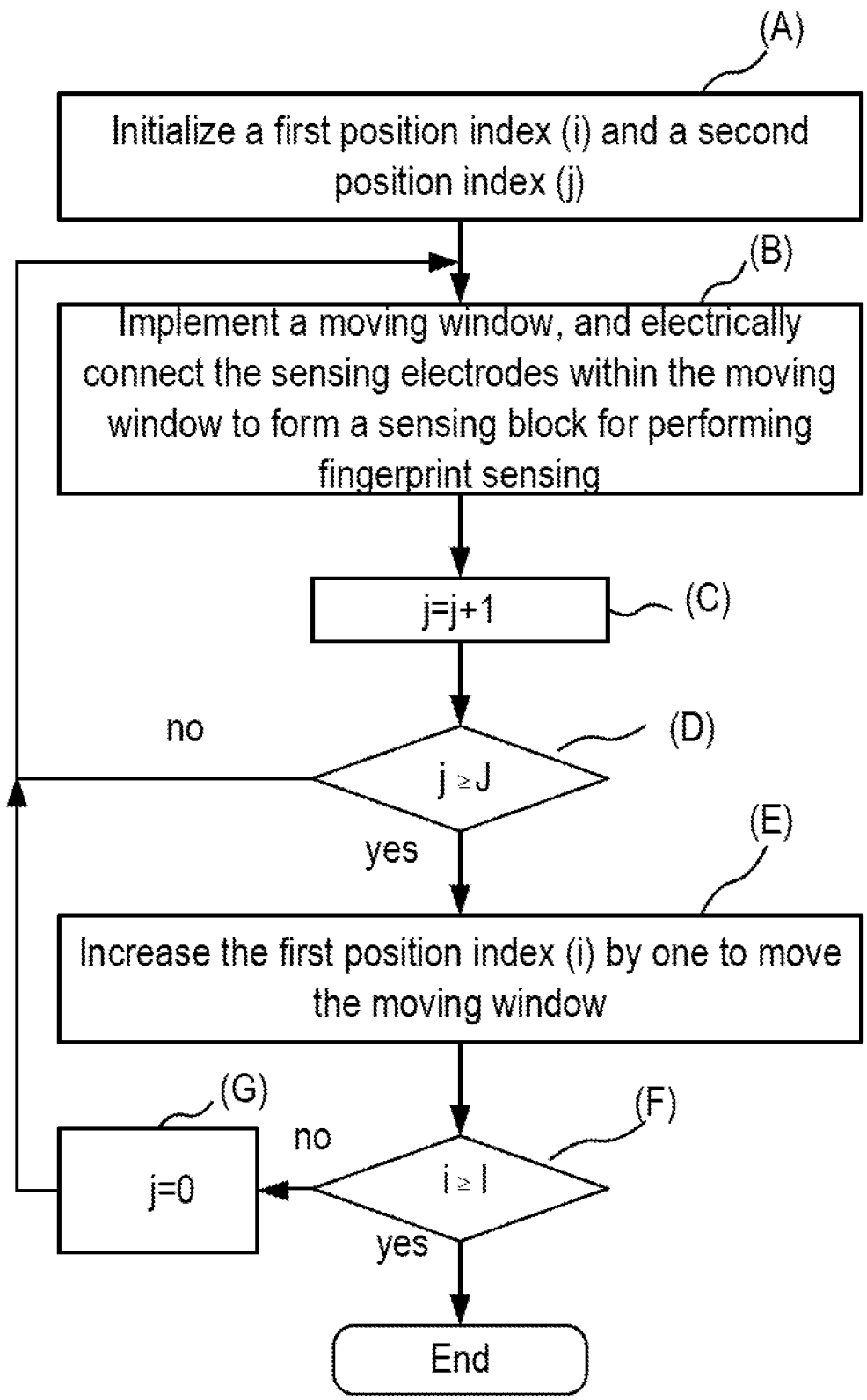
FIG. 5 is a flowchart of a combinational sensing type fingerprint identification method according to the present invention.

FIG. 5 is a flowchart of a combinational sensing type fingerprint identification method according to the present invention, which is applied in the aforementioned fingerprint identification device 200 which, as shown in FIG. 2, includes a controller 280 and a plurality of sensing electrodes 220 arranged on one surface of a substrate 210 in rows and columns to form an N×M (N rows, M columns) matrix for sensing a fingerprint, where N and M are each a positive integer.

At first, in step (A), the controller 280 initializes a first position index (i) and a second position index (j), in which the first position index (i) and the second position index (j) are configured to be 0. The first position index (i) and the second position index (j) indicate a position of a moving window, which corresponds to the sensing block 290. The sensing electrodes inside the moving window are electrically connected to form the sensing block 290, and the sensing electrodes outside the moving window are electrically connected to form a non-sensing block.

In this embodiment, the sensing block 290 has N1×M1 sensing electrodes 220, where N1 and M1 are each a positive integer, $1 \le N1 \le N$, and $1 \le M1 \le M$, and thus we have $0 \le i \le I$, $0 \le j \le J$, $J=M-M1-1$, and $I=N-N1-1$, where I is a first threshold and J is a second threshold. The first position index (i) corresponds to the first bit shift register 281, and the second position index (j) corresponds to the second bit shift register 283. For the parameters i, j, I, J, N, N1, M, and M1, some have a binary representation and some have a decimal representation, which can be accomplished by those skilled in the art based on the disclosure of the present invention.

Figure 6A:
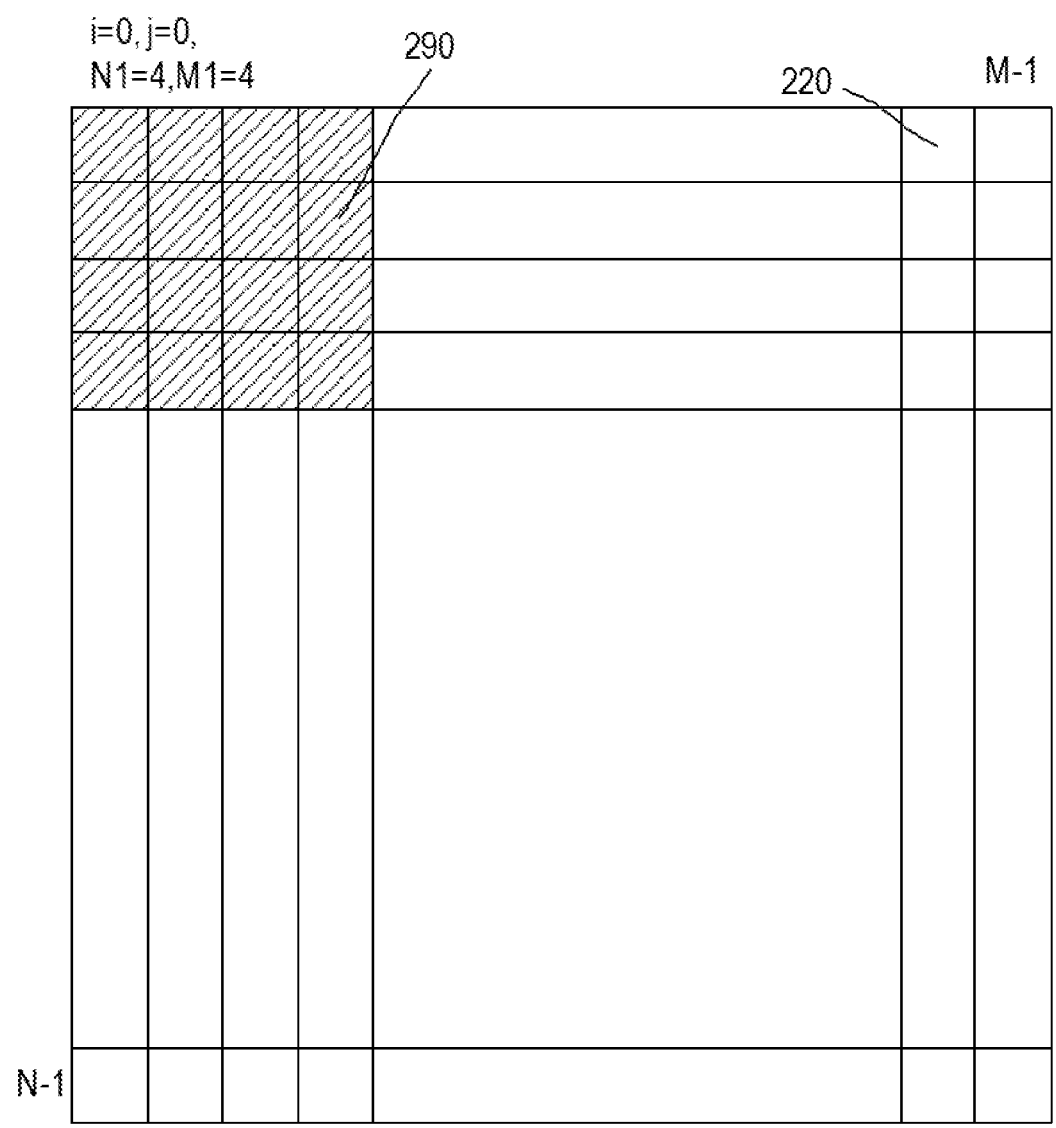
FIG. 6A schematically illustrates a moving window on a plurality of sensing electrodes when i=0, j=0, N1=4, and M1=4 according to the present invention.

In step (B), a moving window is implemented at a start position on the sensing electrodes formed as the N×M matrix, and those of the sensing electrodes within the moving window are electrically connected to form a sensing block 290 for performing a fingerprint sensing. FIG. 6(A) schematically illustrates a moving window (the sensing block 290) on a plurality of sensing electrodes when i=0, j=0, N1=4, and M1=4, wherein the moving window is indicated by slashes, M1 indicates a width of the moving window (the sensing block 290), and N1 indicates a height of the moving window (the sensing block 290). As shown in FIG. 6(A), N1 is 4 and M1 is 4. When N1 is 4 and M1 is 4, we have I=N−N1−1 and J=M−M1−1. When the fingerprint sensing is performed through the sensing block 290, the sensing electrodes of the non-sensing block are electrically connected to the common signal (Common signal) for shielding the sensing block 290 so as to prevent the sensing block 290 from the noise interference and thus increase the sensing sensitivity.

Figure 6B:
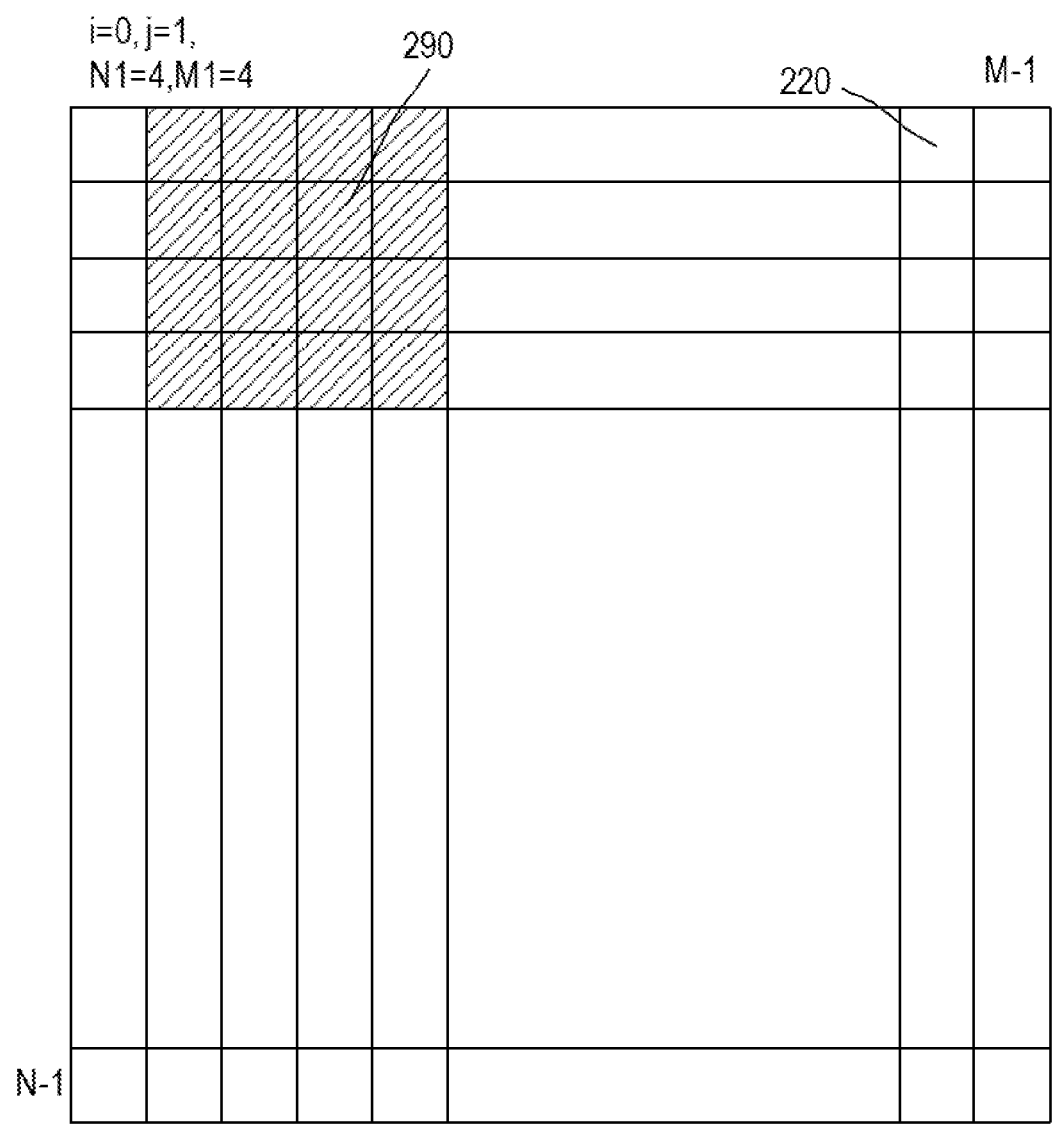
FIG. 6B schematically illustrates a moving window on a plurality of sensing electrodes when i=0, j=1, N1=4, and M1=4 according to the present invention.

In step (C), the controller 280 increases the second position index (j) by one to move the moving window and form the sensing block at another position. As shown in FIG. 6(B), it is a schematic diagram of the moving window (the sensing block 290) on a plurality of sensing electrodes when i=0, j=1, N1=4, and M1=4, where the moving window is indicated by the slashes.

In step (D), the controller 280 determines whether the second position index (j) is greater than or equal to a second threshold (J). If no, step (B) is executed and, if yes, step (E) is executed.

In step (E), the controller increases the first position index (i) by one to move the moving window.

In step (F), the controller 280 determines whether the first position index (i) is greater than or equal to the first threshold (I). If yes, the process ends and, if no, step (G) is executed to initialize the second position index (j), and then the process returns to step (B).

In summary, the present invention can dynamically configure the size of the sensing block 290 based on an effective width of ridges and valleys and move the sensing block 290 over the entire sensing plane so as to have a stronger sensed signal thereby effectively and accurately detecting the fingerprint.

Although the present invention has been explained in relation to its preferred embodiment, it is to be understood that many other possible modifications and variations can be made without departing from the spirit and scope of the invention as hereinafter claimed.

What is claimed is:

1. A combinational sensing type fingerprint identification device, comprising:
    a substrate;
    a plurality of sensing electrodes arranged on the substrate for sensing a fingerprint and generating corresponding sensed signals;
    a plurality of sensing electrode switches arranged in columns and rows, each corresponding to one sensing electrode and having a first terminal, a second terminal connected to a common signal, a third terminal connected to a corresponding sensing electrode, and a control terminal;
    a plurality of first sensed signal connection lines, each connected to the first terminals of the sensing electrode switches in one column; and
    a controller connected to the control terminal of each of the sensing electrode switches for controlling whether the sensing electrode switches are electrically connected to the common signal or corresponding first sensed signal connection lines,
    wherein the controller configures the control terminals of the sensing electrode switches for allowing a part of the sensing electrodes to be electrically connected to the corresponding first sensed signal connection lines, thereby sensing the fingerprint and generating the corresponding sensed signals.

2. The fingerprint identification device as claimed in claim 1, wherein the controller configures the control terminals of the sensing electrode switches to divide the sensing electrodes into at least one sensing block and at least one non-sensing block, thereby performing fingerprint sensing with the at least one sensing block.

3. The fingerprint identification device as claimed in claim 2, wherein the sensing electrodes of the at least one non-sensing block are electrically connected to the common signal when performing fingerprint sensing with the at least one sensing block, thereby shielding the at least one sensing block from noise interference.

4. The fingerprint identification device as claimed in claim 3, wherein the common signal is a direct current voltage or a specific alternating current voltage signal.

5. The fingerprint identification device as claimed in claim 3, wherein the common signal is generated by using an amplifier with a gain greater than zero to amplify the sensed signal on a sensed signal connection line.

6. The fingerprint identification device as claimed in claim 3, wherein the plurality of sensing electrodes are arranged on one surface of the substrate in rows and columns for forming an N×M matrix of sensing plane on the surface of the substrate, where N and M are each a positive integer.

7. The fingerprint identification device as claimed in claim 6, wherein the at least one sensing block has N1×M1 sensing electrodes, where N1 and M1 are each a positive integer, $1 \le N1 \le N$, and $1 \le M1 \le M$.

8. The fingerprint identification device as claimed in claim 7, wherein the plurality of first sensed signal connection lines include M first sensed signal connection lines.

9. The fingerprint identification device as claimed in claim 8, further comprising:
    M connection line switches, each corresponding to one of the first sensed signal connection lines and having a first terminal, a second terminal connected to the common signal, a third terminal connected to a corresponding first sensed signal connection line, and a control terminal;

M second sensed signal connection lines, each connected to the second terminals of the sensing electrode switches in one column and having one terminal connected to the common signal; and a signal line connected to the first terminals of the M connection line switches and having one terminal connected to the controller.

10. The fingerprint identification device as claimed in claim 9, wherein the controller comprises:

a first bit shift register having a plurality of bits each connected to the control terminals of the sensing electrode switches in one corresponding row;

a second bit shift register having a plurality of bits each connected to the control terminal of a corresponding connection line switch; and a common signal generator for generating a specific DC voltage or AC voltage signal.

11. The fingerprint identification device as claimed in claim 10, wherein each of the sensing electrodes is a polygon, circle, ellipse, rectangle, or square.

12. The fingerprint identification device as claimed in claim 11, wherein each of the sensing electrodes has a width smaller than or equal to 200 µm and a length smaller than or equal to 200 µm.

13. A combinational sensing type fingerprint identification method, which is applied in a fingerprint identification device including a controller and a plurality of sensing electrodes arranged on one surface of a substrate in rows and columns to form an N×M matrix for sensing a fingerprint, where N and M are each a positive integer, the method comprising the steps of:

(A) the controller initializing a first position index and a second position index;

(B) implementing a moving window at a start position on the sensing electrodes formed as the N×M matrix, and electrically connecting the sensing electrodes within the moving window to form a sensing block for performing fingerprint sensing;

(C) the controller increasing the second position index by one so as to move the moving window and form the sensing block at another position;

(D) the controller determining whether the second position index is greater than or equal to a second threshold, and returning to step (B) when the second position index is not greater than or equal to the second threshold;

(E) the controller increasing the first position index by one so as to move the moving window; and (F) the controller determining whether the first position index is greater than or equal to a first threshold, and ending when the second position index is greater than or equal to a second threshold; otherwise performing a step (G) to initialize the second position index, and then return to step (B).

14. The fingerprint identification method as claimed in claim 13, wherein the sensing electrodes inside the moving window are electrically connected to form the sensing block, and the sensing electrodes outside the movable window are electrically connected to form a non-sensing block.

15. The fingerprint identification method as claimed in claim 14, wherein, when performing the fingerprint sensing with the sensing block, the sensing electrodes of the non-sensing block are electrically connected to a common signal for shielding the sensing block from a noise interference.

* * * * *